US010594842B2

(12) United States Patent
Gordon

(10) Patent No.: US 10,594,842 B2
(45) Date of Patent: Mar. 17, 2020

(54) METHOD FOR REAL-TIME SYNCHRONIZATION BETWEEN A DEVICE AND HOST SERVERS

(71) Applicant: Yuen Yu Tang Gordon, Singapore (SG)

(72) Inventor: Yuen Yu Tang Gordon, Singapore (SG)

(73) Assignee: ZingMobile Pte Ltd, Singapore (SG)

( * ) Notice: Subject to any disclaimer, the term of this patent is extended or adjusted under 35 U.S.C. 154(b) by 677 days.

(21) Appl. No.: 13/684,240

(22) Filed: Nov. 22, 2012

(65) Prior Publication Data

US 2013/0275494 A1    Oct. 17, 2013

(30) Foreign Application Priority Data

Apr. 17, 2012   (SG) ................................ 201202794-2

(51) Int. Cl.
*H04L 29/06*       (2006.01)
*H04L 29/08*       (2006.01)

(52) U.S. Cl.
CPC .......... *H04L 67/42* (2013.01); *H04L 67/1095* (2013.01); *H04L 67/303* (2013.01); *H04L 67/16* (2013.01)

(58) Field of Classification Search
CPC ..... H04L 67/42; H04L 67/16; H04L 67/1095; H04L 67/303; G06F 15/16; G06F 17/30884; G06F 8/65; G06F 8/60; G06F 8/61; H04W 8/24
USPC .......... 709/203, 224, 217; 726/4; 340/539.1; 717/171; 370/255; 707/E17.121; 719/328
See application file for complete search history.

(56) References Cited

U.S. PATENT DOCUMENTS 5,949,680 A * 9/1999 Kettelkamp ............. B26D 5/34 235/380
7,039,656 B1 * 5/2006 Tsai et al.
(Continued)

FOREIGN PATENT DOCUMENTS

| KR | 10-0774843 B1 | 11/2007 |
| KR | 10-0787575 B1 | 12/2007 |
| KR | 10-2010-004429 A | 1/2010 |

OTHER PUBLICATIONS

International Search Report and Written Opinion of International Application No. PCT/SG2013/000146 completed Jun. 26, 2013 and dated Jun. 27, 2013 (9 pages).
(Continued)

*Primary Examiner* — Backhean Tiv
*Assistant Examiner* — Schquita D Goodwin
(74) *Attorney, Agent, or Firm* — Pyprus Pte Ltd

(57) ABSTRACT

The present invention relates to a method for real-time synchronization between a device and host servers, characterized by: providing an embedded program to the device to enable self discovery of the device; executing a decision controller process of the embedded program on the device to detect a tag identity previously generated and embedded in the device, by the host servers; in absence of the tag identity, scanning the device to obtain a device profile, allocating a tag identity to the device profile, and storing the tag identity in the predetermined location; performing synchronization between the device and the host servers according to the tag identity.

3 Claims, 1 Drawing Sheet

(56) References Cited

U.S. PATENT DOCUMENTS

| | | | | |
|---|---|---|---|---|
| 7,231,450 | B1* | 6/2007 | Clifford | G06F 21/10 709/202 |
| 7,237,101 | B1* | 6/2007 | Dono | G06F 9/4415 713/1 |
| 7,881,745 | B1* | 2/2011 | Rao | G06F 8/65 455/551 |
| 8,019,863 | B2 | 9/2011 | Jeide et al. | |
| 8,019,900 | B1* | 9/2011 | Sekar | H04L 67/1095 709/217 |
| 8,019,986 | B2* | 9/2011 | Chaudhari | H04L 29/06027 713/1 |
| 8,131,875 | B1* | 3/2012 | Chen | H04M 1/72522 707/E17.121 |
| 8,762,195 | B1* | 6/2014 | Martin | G06Q 30/00 705/7.35 |
| 8,965,366 | B1* | 2/2015 | Somayajula | H04W 60/00 370/328 |
| 9,032,383 | B2* | 5/2015 | D'Aurelio | G06F 17/30893 717/169 |
| 2004/0003224 | A1* | 1/2004 | Rabe | G06F 9/4401 713/1 |
| 2004/0024817 | A1* | 2/2004 | Pinkas | 709/203 |
| 2004/0117414 | A1* | 6/2004 | Braun | G06F 8/65 |
| 2005/0010663 | A1* | 1/2005 | Tatman et al. | 709/224 |
| 2006/0080415 | A1* | 4/2006 | Tu | H04L 67/1095 709/220 |
| 2006/0136892 | A1* | 6/2006 | Branch | G06F 8/65 717/168 |
| 2006/0190569 | A1 | 8/2006 | Neil et al. | |
| 2006/0277598 | A1* | 12/2006 | Ahn | G06F 21/10 726/5 |
| 2008/0098094 | A1* | 4/2008 | Finkelstein | G06F 9/4411 709/220 |
| 2008/0168477 | A1* | 7/2008 | Flegg | G06F 8/63 719/327 |
| 2008/0195664 | A1* | 8/2008 | Maharajh | G06F 17/30035 |
| 2009/0083727 | A1* | 3/2009 | Fu | G06F 21/57 717/172 |
| 2009/0134997 | A1* | 5/2009 | Godlewski | 340/539.1 |
| 2009/0164283 | A1* | 6/2009 | Coley | G06Q 10/06311 705/7.13 |
| 2009/0177736 | A1* | 7/2009 | Christensen | G06Q 30/02 709/203 |
| 2009/0313645 | A1* | 12/2009 | Sathish | H04L 67/02 719/328 |
| 2010/0107155 | A1* | 4/2010 | Banerjee | G06F 8/60 717/177 |
| 2010/0130167 | A1* | 5/2010 | Bennett | H04L 63/30 455/411 |
| 2010/0274930 | A1* | 10/2010 | Thakkar | G06F 8/65 710/8 |
| 2011/0035790 | A1* | 2/2011 | Kruis | G06F 17/30884 726/4 |
| 2011/0255444 | A1* | 10/2011 | Soliman | H04L 41/12 370/255 |
| 2011/0321014 | A1* | 12/2011 | Nagoria | G06F 11/2289 717/125 |
| 2012/0023554 | A1* | 1/2012 | Murgia et al. | 726/4 |
| 2012/0144378 | A1* | 6/2012 | Shah | G06F 8/60 717/170 |
| 2012/0179653 | A1* | 7/2012 | Araki | G06F 17/30575 707/634 |
| 2013/0085886 | A1* | 4/2013 | Satish | G06Q 30/02 705/26.7 |
| 2013/0166777 | A1* | 6/2013 | Chen | H04M 1/72522 709/246 |
| 2013/0219383 | A1* | 8/2013 | Hilerio | G06F 8/65 717/178 |

OTHER PUBLICATIONS

Written Opinion of Singapore application No. 2012027942 dated Jun. 24, 2014 (12 pages).

* cited by examiner

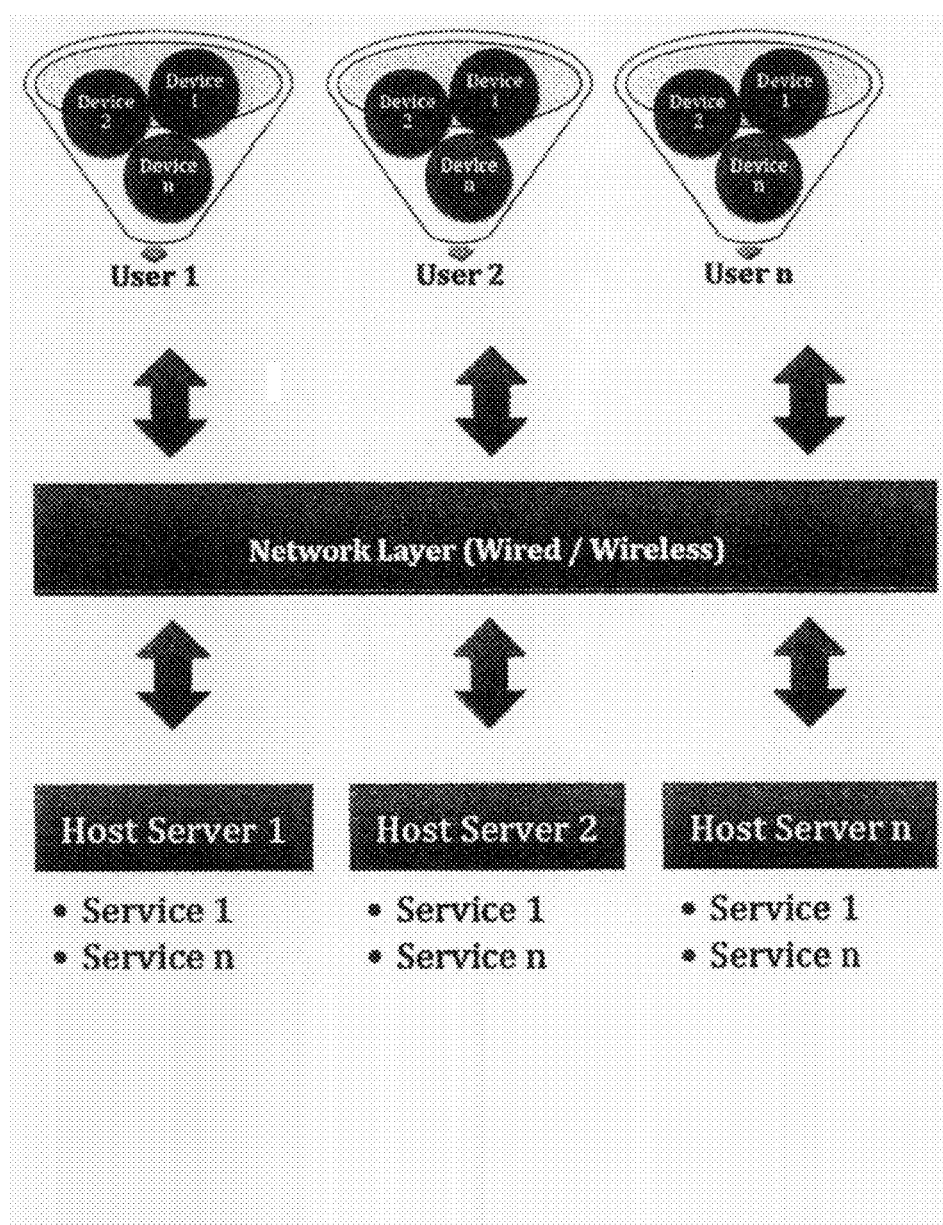

METHOD FOR REAL-TIME SYNCHRONIZATION BETWEEN A DEVICE AND HOST SERVERS

BACKGROUND OF THE INVENTION

Field of the Invention

This invention relates to a method for autonomous synchronization in a device, and more particularly to a method for enabling a device to be self-aware, and independently initiating connection with host servers for synchronization.

Description of Related Arts

Traditionally, networks operate on the principle that servers discover the properties of devices connected to them via scans or polls of the networks. Such scans or polls are typically server-initiated or determined by a central network controller operating within the network's scope of operations. This can result in unnecessary constant network loads and in certain cases, even fail to detect the presence of some of the devices.

Today, a typical user may own a plurality of devices which are interconnected through a network, for example, a local area network (LAN) or wireless LAN or via telecommunications networks such as GPRS and 3G. It can be difficult for the user to keep track of all data and applications on these devices especially when each of the devices has its own particular operating system, device functionalities and capabilities.

US Patent Application Publication No. 20060190569 A1 disclosed a method for facilitating mobile device awareness of new or updated server side applications, in response to a new application or an updated version of an application made available to the server. A message is transmitted over a wireless connection to the devices indicating the availability of the new applications or updated applications. Notification is displayed on each of the devices and the user may choose to register for the new or updated applications. This method relies on a system administrator at a middleware server to trigger the notification message to the mobile devices. Additional server is required and there may be failure to detect the presence of some devices.

U.S. Pat. No. 8,019,863 B2 disclosed a method for synchronizing events between mobile devices and servers. The events to be synchronized between the mobile devices and servers are detected by deducing activities that occurred, followed by reading data records, and creating packets of operation for recreating the activities on the target, wherein the target is either of the mobile device or servers. Detection of the activities is conducted by a listener which polls the server and the device. Similarly, this method requires scanning or polling to be performed on the servers and the mobile devices which require additional resources.

With the rapid proliferation of mobile devices, it can be seen in the prior arts there exists a need to provide a method that permits devices to autonomously initiate self-check of their properties and establish connection for synchronization with the servers.

SUMMARY OF INVENTION

It is an objective of the present invention to provide a method for enabling devices to be autonomously self-aware in relation to content of host servers.

It is also an objective of the present invention to provide a method for enabling devices to independently present or update device capabilities to host servers and receive appropriate responses from the host servers that are connected.

It is yet another objective of the present invention to provide a method for real-time synchronization between a device and host servers.

It is a further objective of the present invention to provide a method for enabling the device properties and status to a host server for synchronizing applications, content, and data, according to the device's unique capabilities.

Accordingly, these objectives may be achieved by following the teachings of the present invention. The present invention relates to a method for real-time synchronization between a device and host servers, characterized by: providing an embedded program to the device to enable self discovery of the device; executing a decision controller process of the embedded program on the device to detect a tag identity previously generated and embedded in the device, by the host servers; in absence of the tag identity, scanning the device to obtain a device profile, allocating a tag identity to the device profile, and storing the tag identity in the device; performing synchronization between the device and the host servers according to the tag identity.

BRIEF DESCRIPTION OF THE DRAWINGS

The features of the invention will be more readily understood and appreciated from the following detailed description when read in conjunction with the accompanying drawings of the preferred embodiment of the present invention, in which:

FIG. 1 is a block diagram illustrating an example in which a method of synchronization between devices and hot servers is implemented.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field. The present invention will now be described with reference to FIG. 1.

The present invention relates to a method for real-time synchronization between a device and host servers, characterized by:

provide an embedded program to the device to enable self discovery of the device;

executing a decision controller process of the embedded program on the device to detect a tag identity previously generated and embedded in the device, by the host servers;

in absence of the tag identity, scanning the device to obtain a device profile, allocating a tag identity to the device profile, and storing the tag identity in the device; performing synchronization between the device and the host servers according to the tag identity.

In a preferred embodiment of the method for real-time synchronization between a device and host servers, the decision controller process is handled by critical binary functions.

In a preferred embodiment of the method for real-time synchronization between a device and host servers, the device profile comprises the device physical and logical properties.

In a preferred embodiment of the method for real-time synchronization between a device and host servers, the tag identity allocated to a device profile is associated to a user's profile.

In a preferred embodiment of the method for real-time synchronization between a device and host servers, the synchronization is initiated autonomously or upon request by a user.

In a preferred embodiment of the method for real-time synchronization between a device and host servers, the synchronization is performed upon confirmation by the host servers the permissible authorizations granted to the device.

The present invention comprises an embedded program on the device which enables self discovery of the device. In a preferred embodiment, the embedded program comprises proprietary software codes for operations on the device and the servers. In a preferred embodiment, the program can be implemented in either software or hardware in one or more devices, which are capable of fetching computing instructions found therein. For example, the program is embedded in a silicon chip attached on the circuit board of the device. Alternatively, the program may be a pre-compiled software which may be downloaded and installed as part of the manufacturer's firmware upgrade. In a preferred embodiment, the embedded program initializes itself during the standard bootstrap process when the device is switched on.

The decision controller process is executed to detect a tag identity previously generated and embedded in the device. In a preferred embodiment, the tag identity is embedded in a predetermined location such that the program would be able to locate the tag identity. For example, if the tag identity is embedded in a silicon chip, the program would be written to locate the tag identity at where the chip is located at the circuit board of the device. If the tag identity is embedded in software form, the specific file storing the tag identity would be search upon by the program. In a preferred embodiment, the decision controller process is handled by critical binary functions, thereby increasing the speed of the decision controller process.

If the tag identity is not located, the decision controller process will proceed to scan the device for discovering the device environment, and thus to obtain the device profile from the device. In a preferred embodiment, the device profile comprises physical and logical properties of said device. The device profile includes details of the device including but not limited to the device model, operating system version, and other pertinent information for reference to the compatibility and availability to various applications and applications data. With the device profile obtained, the host server allocates a tag identity to the device profile, which is then stored on a predetermined location in the device. In a preferred embodiment, the user may have multiple devices which are each allocated with a unique tag identity, but are associated under one user's profile to ensure data integrity, privacy of content, and device separation.

Once the tag identity has been identified, the device autonomously initiates an independent remote connection request to a host server through the process communication system. The host server confirms the permissible authorizations granted to the device, establishes the connection request and synchronizes the device with appropriate device-specific applications, content and data, according to the tag identity. For example, if a new updated version of mobile application has been made available at the host server, real-time synchronization allows the compatible device to be informed and have the application installed autonomously. In another example, if the user changes to another similar or dissimilar mobile device, the tag identity associated with the user profile allows the exact operational environment to be reinstated according to the data stored in the host server under the user profile, said operational environment includes application settings such as instant messaging and email setting. Additionally, if the new device has better capabilities than the previous, for example, a change in the operating system of the device, the embedded program recognizes these capabilities in real-time and automatically scales to enable new additional features to enhance the user's experience on the new mobile device. In a preferred embodiment, the synchronization is initiated autonomously or requested by a user. In a preferred embodiment, the synchronization can be independently initiated from the device to host servers or vice versa.

With reference to FIG. 1, the network layer comprises a combination of wired or wireless network backbone to which a plurality of devices are connected and autonomously synchronized with a plurality of host servers. Each host server provides a plurality of specific services and products including but not limited to provision of applications, content, and data. Each user's plurality of devices is uniquely tagged with the tag identity under each user profile. The particular type of operating system running on each device and the host servers is not significant to the proper operation of the present invention.

Although the present invention has been described with reference to specific embodiments, also shown in the appended figures, it will be apparent for those skilled in the art that many variations and modifications can be done within the scope of the invention as described in the specification and defined in the following claims.

The invention claimed is:

1. A method for enabling a device, being connected to host servers, to be autonomously self-aware in relation to content of the host servers and to independently present or update device capabilities to the host servers and receive appropriate response from the host servers for real-time synchronization between a device and host servers, wherein an executable program for the method is embedded in a silicon chip attached on a circuit board of the device, characterized by:

self-initializing the embedded executable program when the device is switched on, wherein the embedded executable program enables self-discovery of the device;

executing, by the device, a decision controller process of the embedded executable program to detect a tag identity previously generated by the host servers and embedded in the device;

in absence of the tag identity, executing the decision controller process of the embedded executable program to scan the device to obtain a device profile from the device, wherein, when the obtained device profile is presented to the host servers, the host servers allocate a tag identity to the device profile, and storing the allocated tag identity on a predetermined location in the device;

when the tag identity has been identified, autonomously initiating, by the device, an independent remote connection request to the host server; wherein the host servers confirm permissible authorizations granted to the device, establish the connection with the device; and performing synchronization between the device and the host servers according to the tag identity; wherein the device independently presents or updates device capabilities to the host servers; and wherein the host servers synchronize the device with appropriate device-specific applications, content and data.

2. A method according to claim 1, wherein the device profile comprises-device physical and logical properties.

3. A method according to claim 1, wherein the tag identity is associated to a user's profile.

* * * * *